(12) United States Patent
Luo et al.

(10) Patent No.: US 6,324,322 B1
(45) Date of Patent: Nov. 27, 2001

(54) FUSED-FIBER MULTI-WINDOW WAVELENGTH FILTER USING UNBALANCED MICHELSON INTERFEROMETER

(75) Inventors: Huali Luo; Chi-Hung Huang; Joseph C. Chon, all of Fremont, CA (US)

(73) Assignee: WaveSplitter Technologies, Inc., Fremont, CA (US)

( * ) Notice: Subject to any disclaimer, the term of this patent is extended or adjusted under 35 U.S.C. 154(b) by 0 days.

(21) Appl. No.: 09/327,148

(22) Filed: Jun. 7, 1999

(51) Int. Cl.[7] ...................................................... G02B 6/26
(52) U.S. Cl. .................. 385/43; 385/39; 385/45; 385/47
(58) Field of Search ........................ 385/43, 39, 45, 385/47, 30, 42, 51

(56) References Cited

U.S. PATENT DOCUMENTS

| | | | |
|---|---|---|---|
| 4,831,631 | * | 5/1989 | Haeussler et al. ................. 372/92 |
| 5,450,511 | * | 9/1995 | Dragone ................................. 385/37 |
| 5,805,751 | * | 9/1998 | Kewitsch et al. ..................... 385/43 |
| 5,915,051 | * | 6/1999 | Damask et al. ....................... 385/16 |
| 5,995,530 | * | 11/1999 | Dutting et al. ....................... 372/50 |

* cited by examiner

Primary Examiner—Ellen E. Kim
(74) Attorney, Agent, or Firm—Skjerven Morrill MacPherson LLP; Tom Chen

(57) ABSTRACT

A fused-fiber multi-window wavelength filter (MWF) is constructed with an unbalanced Michelson Interferometer, in which input light passing through the fused coupling region is decoupled and travels along two fibers of different optical path lengths. The two light signals travel to the end of the two fibers, where a highly reflective coating reflects the light back toward the coupling region, where the signals are coupled again and then decoupled after exiting the coupling region. By adjusting the optical path length difference, either by changing the length or refractive index, a signal at a desired wavelength can be obtained at the filter output. The MWF can be combined with other MWFs to form more compact sized multi-window wavelength division multiplexers (MWDMs) and dense WDMs. Passive thermal compensation techniques can be applied to one or both of the reflecting fibers to maintain the desired optical path length difference.

16 Claims, 5 Drawing Sheets

FUSED-FIBER MULTI-WINDOW WAVELENGTH FILTER USING UNBALANCED MICHELSON INTERFEROMETER

BACKGROUND OF THE INVENTION

1. Field of the Invention

The present invention relates to optical filters and, in particular, to multi-window wavelength filters using fused-fiber unbalanced Michelson Interferometers.

2. Discussion of the Related Art

With existing fiber optic networks, there is often the need to increase information transmission capacity. However, both physical and economic constraints can limit the feasibility of increasing transmission capacity. For example, installing additional fiber optic cable to support additional signal channels can be cost prohibitive, and electronic system components may impose physical limitations on the speed of information that can be transmitted. One way to increase the capacity of an existing fiber optic link without modification to the fiber itself is by multiplexing multiple signals via wavelength division multiplexers (WDMs). The use of WDMs provides a simple and economical way to increase the transmission capacity of fiber optic communication systems by allowing multiple wavelengths to be transmitted and received over a single optical fiber through signal wavelength multiplexing and demultiplexing. The demultiplexed signals can then be routed to the final destinations. WDMs can be used in fiber optic communication systems for other purposes as well, such as dispersion compensation, noise reduction, and gain flatting, i.e., maintaining a uniform gain within the usable bandwidth for erbium-doped amplifiers.

WDMs can be manufactured using, for example, biconical tapered fusion (BTF) technology. Typically, two optical fibers are fused together along an interior portion to form a fused-fiber coupler, so that light of two wavelengths (i.e., 1310 nm and 1550 nm) entering the input terminals of the first and second fibers, respectively, are multiplexed onto a single fiber. The coupling ratios for the two channels (the signals at 1310 nm and 1550 nm) exhibit complementary sinusoidal behavior for amplitude as a function of frequency within the passband of the WDM, with each channel having one or more peaks (or windows) within the passband. Information carried by the two signals along the single fiber is then demultiplexed at the WDM outputs.

Multi-window WDMs (MWDMS) have two or more peaks of amplitude as a function of frequency (or operational windows) for each channel within a passband. MWDMs can also be made using BTF technology by twisting two optical fibers together, fusing the center portion together, and pulling the fibers until a desired multi-window transmission spectrum appears at a monitored fiber output terminal. Such a long-tapered-fusing technology is discussed in commonly-owned U.S. Pat. No. 5,809,190, entitled "Apparatus and Method of Making a Fused Dense Wavelength-Division Multiplexer", which is incorporated by reference herein in its entirety.

One essential component of multiplexing and demultiplexing multiple signals is the ability to accurately separate the individual signals of different wavelengths from the combined signal. Many techniques for demultiplexing wavelength-multiplexed signals have been developed and proposed. One conventional method uses prisms and diffraction gratings to spatially separate signals of different wavelengths from a fiber. These devices suffer from lack of programmability and flexibility, poor switching performance, and the difficulty of integration. Moreover, such systems often require precision positioning of various components to ensure desired optical alignment for proper operation.

Other techniques utilize optical bandpass filters that selectively pass an optical beam of a specified wavelength. The optical filter is capable of selecting and separating any desired wavelength out of a wavelength division multiplexed optical signal. In the wavelength multiplex network, a large number of information signals are multiplexed on a single optical fiber, and such a very large number of optical filters, each having its own passband and a central passband wavelength, are needed in order to demultiplex the optical signals or to switch the connection of the optical channels.

The underlying principle behind the operation of some optical filters is multi-beam optical interference. Here, the optical path length of the individual light beams in the device is varied, after which the beams are interfered. Since the effective path length is wavelength dependent, it follows that the interference is wavelength dependent, which yields a wavelength dependent optical response. Each filter can be tuned to pass signals at a desired wavelength, while attenuating or blocking signals at all other wavelengths.

Conventionally, the optical filters for use in the optical telecommunication network have been formed based upon a multi-layer mirror or a Fabry-Perot resonator. In such conventional filters, the passband wavelength has been determined by the construction of the filter such as the geometrical dimension or the composition of the material. Thereby, one has to provide a large number of filters in correspondence to the signal channels of the telecommunication system, together with a distribution network for distributing the optical signals to each of these filters. When the number of the optical channels is increased, such a construction becomes inevitably bulky and expensive. Other typical filters include liquid crystal tunable filters (LCTFs), acousto-optical tunable filters (AOTFs), and reflective waveguide arrays. These and other types of optical filters can also be difficult to tune and/or subject to external influences such as temperature, movement, etc.

In addition, even though optical fibers have high information capacity, the overall optical communication link may be restricted by practical bandwidth considerations, thereby limiting the size of the passbands. Therefore, to increase the efficiency of bandwidth use, the passband should contain as many communication channels or windows as possible, subject to constraints with the system. To increase the number of channels or windows, the bandwidth of each channel or window and/or the separation between wavelength peaks should be minimized. Separating signals passed through MWDMs can be accomplished with tunable multi-window wavelength filters. However, as the number of channels within a passband increases, it becomes more difficult for the multi-window wavelength filter to separate or filter the various wavelengths.

Accordingly, small-sized multi-window wavelength filters which are durable and tunable to desired wavelengths are desired.

SUMMARY OF THE INVENTION

The present invention provides a multi-window wavelength filter (MWF) using an unbalanced Michelson Interferometer, where the MWF is used to construct multi-window wavelength division multiplexers (MWDMs) and dense WDMs that are smaller sized and tunable to desired wavelengths.

In accordance with the present invention, a MWF is formed from a fused-fiber coupler with the two fibers that carry the decoupled input signals having an optical path length difference and ends that are coated with a highly reflective coating. Input light entering one fiber of the MWF is decoupled after it exits the coupling region. The two signals then travel along the two fibers until they reach the reflective coating. At this time, the light is reflected back toward the coupling region, where interference occurs between the two signals from the two fibers, and exits the coupling region and then the MWF output. The path length difference results in constructive and destructive interference of the light as it travels through the coupling region, resulting in complementary signals at output of the coupling region. The signal taken at the MWF output can be adjusted by changing the optical path length to obtain a desired signal at a particular wavelength. The optical path length can be changed by changing the relative lengths and/or the refractive indexes of the fibers or portions thereof, or a combination of the two.

According to another aspect of the invention, the MWF is used to form an MWDM in several different ways. In one embodiment, an MWDM is formed with two essentially identical MWFs coupled (e.g., spliced) to a 3-dB coupler. The output of the MWDM is taken at complementary fibers of the two MWFs, resulting in multiple channels within a given wavelength. The channel separation can be changed, which changes the number of channels in the wavelength, by varying the optical path length difference of the two MWFs. In another embodiment, an MWDM is formed with an optical circulator coupled (e.g., spliced) to a single MWF. Further, a high isolation MWDM, i.e., one with cross-talk reduction of adjacent and neighboring channels, can be constructed by coupling an MWDM to two additional MWFs having the same channel separation to suppress sidelobes of adjacent Or neighboring channels. Other aspects of the invention include forming a dense WDM (DWDM) by cascading MWDMs formed from the MWF of the present invention.

Temperature-induced refractive index or optical path length changes in the MWF can be compensated for by maintaining the optical path length difference as temperature increases. One type of passive thermal compensation (PTC) technique adjusts the length and/or the refractive index of the two fibers so that a temperature induced refractive index change in one fiber offsets the temperature induced refractive index change in the other fiber. Another PTC technique secures a composite substrate to both fibers, where the composite substrate has different thermal expansion rates at the places where the substrate is secured to the fibers. Thus, as temperature changes, different amounts of tension are applied to each fiber, thereby compensating the effects of temperature on the refractive index. Yet another PTC technique secures a substrate to one of the fibers. The substrate is such that as temperature changes, the substrate expands or contracts to provide the necessary tension increase or decrease to compensate for the changes of the refractive indexes.

This invention will be more fully understood in light of the following detailed description taken together with the accompanying drawings.

BRIEF DESCRIPTION OF THE DRAWINGS

Use of the same reference numbers in different figures indicates similar or like elements.

DETAILED DESCRIPTION

The present invention provides a multi-window wavelength filter (MWF) formed from a fused fiber coupler, where the two fibers at one end of the coupler have different optical path lengths and both fibers have highly reflective coatings at the fiber ends. Broadband light entering the MWF is reflected back out of the MWF, with the two decoupled light signals exhibiting a complementary spectrum due to the optical path length difference. By varying the optical path length difference, the output of the MWF can be adjusted to select a signal at a desired wavelength.

Figure 1:
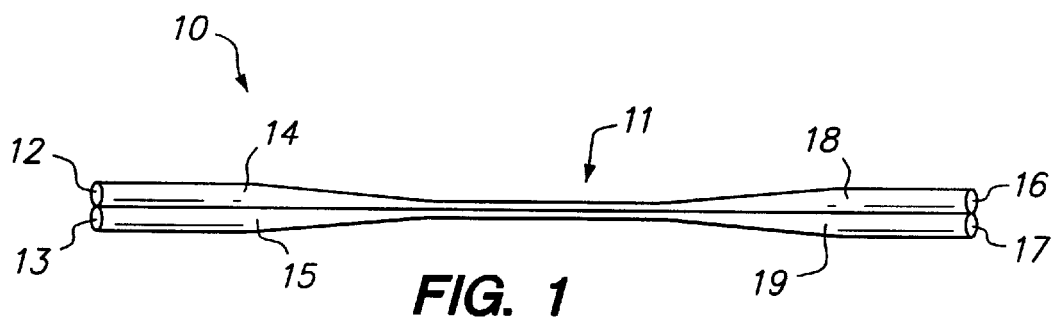
FIG. 1 shows a conventional fused-fiber coupler.

Biconical tapered fusion (BTF) technology has been used to fabricate a variety of optical fiber devices, such as couplers, attenuators, filters, and wideband wavelength division multiplexers (WDMs). A typical fused-fiber coupler 10 is shown in FIG. 1. Fused-fiber coupler 10 can be formed by heating and axially stretching two optic fibers to form a coupling region 11. The resulting coupler 10 has two input ports 12 and 13 and two output ports 16 and 17, capable of coupling a wide range of wavelengths. Coupler 10 divides the power of light entering input port 12, so that a fraction α of light from input port 12 is transmitted out of output port 16 and the remaining fraction 1−α of light from input port 12 is transmitted out of output port 17. Similarly, a fraction 1−α of light from input port 13 is transmitted out of output port 16, and the remaining fraction α of light from input port 13 is transmitted out of output port 17. For example, for a 3-dB coupler, α is 0.5.

Figure 2:
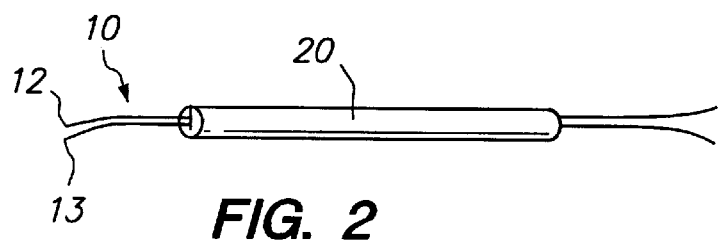
FIG. 2 shows the fused-fiber coupler of FIG. 1 mounted in a quartz sleeve.
Figure 3:
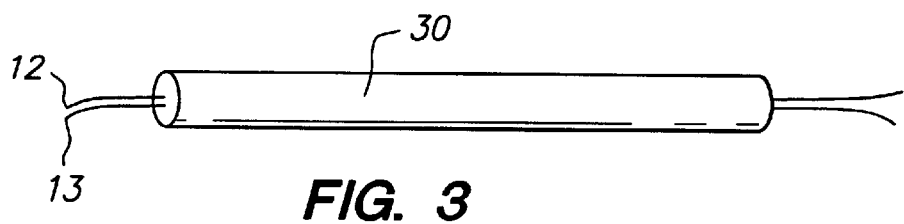
FIG. 3 shows the coupler and sleeve of FIG. 2 enclosed in a protective package.

To provide mechanical protection, as well as thermal stabilization, coupler 10 is typically placed or secured within a quartz sleeve substrate 20, as shown in FIG. 2. Thermal stabilization is achieved because quartz has a thermal expansion coefficient similar to that of the silica fiber. Coupler 10 and quartz sleeve 20 can then be placed inside a sealed package 30, typically metal, to increase mechanical and humidity protection for the fused-fiber coupler, as shown in FIG. 3.

Figure 4:
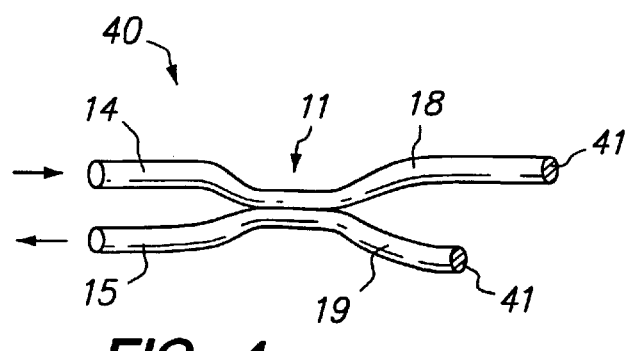
FIG. 4 shows an unbalanced multi-window wavelength filter (MWF) according to the present invention.

According to one aspect of the invention, shown in FIG. 4, a multi-window wavelength filter (MWF) 40 is formed from coupler 10 of FIG. 1, with fiber portions 18 and 19 having different optical path lengths and end terminals 16 and 17 having a high reflective coating 41 to reflect the transmitted signal. Note that coupler 10 can also be packaged, such as shown in FIGS. 2 and 3. Reflective coating 41 can be a metal, such as gold (Au), silver (Ag), or aluminum (Al), or a dielectric, such as an oxide, fluoride, or sulfide, where the coating is characterized by a high reflectivity at the operating wavelength of the filter. Reflective coating 41 can be applied or coated directly onto polished end terminals 16 and 17, or in other embodiments, reflective coating 41 can be first applied to a separate structure, such as fused silica or glass, and the structure then secured to end terminals 16 and 17.

Coupler 10 is typically a 3-dB coupler, which divides the power entering the coupler (e.g., at end terminal 12) equally at the output of the coupling region 11, i.e., the power of the signal traveling out of coupling region 11 is reduced by a factor of two from the signal power entering coupling region 11. Each signal travels along fiber portion 18 or 19 until each arrives at end terminals 16 or 17, at which time, the signals are reflected back along fiber portions 18 and 19 toward coupling region 11. Because of the different optical path lengths of fiber portions 18 and 19, the two optical signals arrive at coupling region 11 at different times and are phase-shifted. The different optical path lengths can be achieved in a variety of ways, such as, but not limited to, varying the actual lengths of the fibers, using fibers or portions of fibers with different refractive indexes, or a combination of the above.

In general, if fiber portion 18 has a length $l_1$ and an index of refraction $n_1$, and fiber portion 19 has a length $l_2$ and an index of fraction $n_2$, the path length difference $\Delta L$ from coupling region 11 will be given by equation (1) as follows:

$$\Delta L = 2(n_1 l_1 - n_2 l_2) \tag{1}$$

Figure 5:
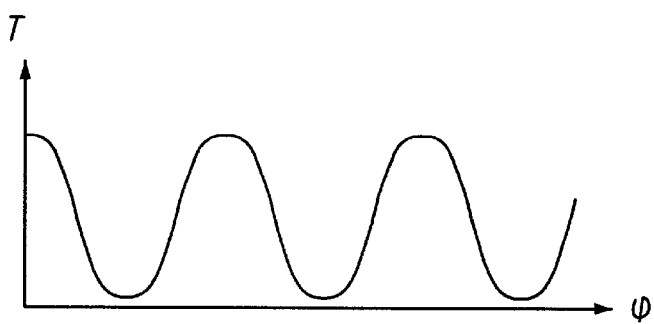
FIG. 5 shows a typical transmission spectrum at the output of the MWF of FIG. 4.

Because of the different optical path lengths, the signals traveling from coupling region 11 are phase-shifted by an amount $\phi$, given by equation (2) as follows:

$$\phi = \frac{4\pi(n_1 l_1 - n_2 l_2)}{\lambda} \tag{2}$$

where $\lambda$ is the central wavelength. After reflection, interference of the two phase shifted signals again occurs in coupling region 11 and the resulting signals transmitted out through fiber portions 14 and 15. The signal exiting terminal end 13 of fiber portion 15 can be adjusted by changing the optical path length to output a selected signal at a desired wavelength. FIG. 5 shows a typical transmission spectrum at the output of terminal end 13 of fiber portion 15 as a function of $\phi$. As seen, the spectrum exhibits a behavior given by equation (3) as follows:

$$\frac{P_{in}}{P_{out}} = \frac{1}{2}(1 + \gamma \cos\phi) \tag{3}$$

where $\gamma$ is a visibility coefficient. Thus, depending on the amount of phase shift $\phi$, a precise output at the central wavelength can be obtained by changing the optical path length difference, as given by equation (1) above.

Figure 6A:
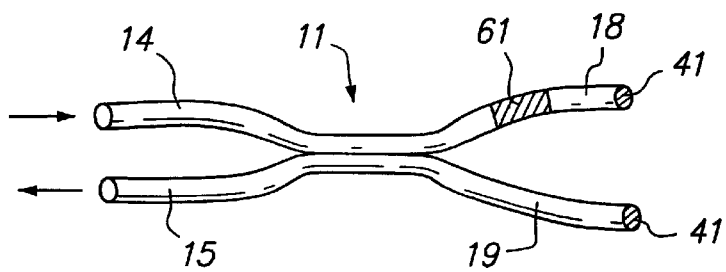
FIGS. 6A and 6B show different ways of changing the optical path length of the MWF of FIG. 4.

In addition to changing the actual lengths and/or refractive indexes of fiber portions 18 and 19, the optical path length difference can also be changed by using fiber portions having only section(s) with different refractive indexes, as shown in FIG. 6A. For example, a predetermined length (dependent on the desired filter output) of fiber section 61 having a refractive index $n_1$ can be conventionally fuse-spliced between an undoped or normal fiber portion 18. Various combinations (length and refractive index) of fiber sections in one or both fiber portions 18 and 19 can be used to vary the optical path length and thus the filter output.

Figure 6B:
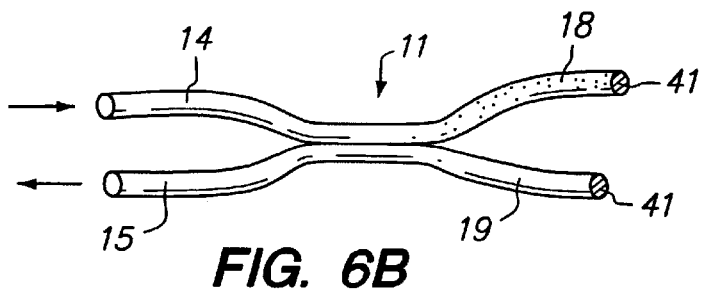
Figure 6C:
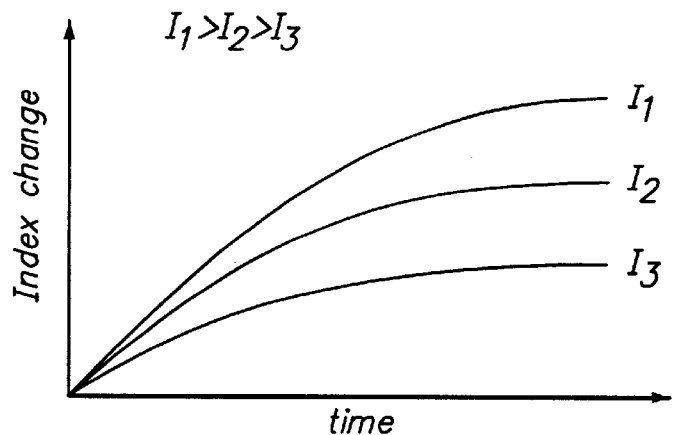
FIG. 6C shows a general relationship between the change of refractive index as a function of UV exposure time for various UV intensities.

Other ways to change the optical path length include making one fiber portion 18 or 19 refractive index-sensitive to UV radiation, e.g., by using hydrogen-loaded or Ge-doped fiber, as shown in FIG. 6B (with fiber portion 18 shown), or by making one fiber portion more refractive index-sensitive to UV radiation than the other fiber portion, e.g., by doping at different levels. Fiber portions 18 and 19 are then exposed to UV radiation, for example, at a wavelength range between 150 and 300 nm. Because the refractive index of only one fiber portion changes from the UV radiation or the refractive indexes of the two fiber portions change in different proportions to the UV radiation, an optical path length difference can be created. Consequently, by changing the UV intensity and exposure time, which changes the difference between the refractive indexes, the output at the central wavelength of the filter can be precisely controlled according to equations (2) and (3) above. FIG. 6C shows a general relationship between the change of refractive index as a function of UV exposure time for various UV intensities. Note that, in general, the longer the UV intensity and/or exposure time, the more the refractive index changes.

If the actual lengths of the fiber portions differ, the phase shift is due to one signal traveling further than the other signal. In this case, a desired filter output can be obtained by precisely cleaving the ends of fiber portions 18 and 19 to achieve the necessary path length difference. If the refractive indexes of the fiber portions differ, the phase shift is due to the two signals traveling at different phase velocities through the fibers. In this case, precisely monitoring the output while changing the refractive index(es) until the desired filter output appears allows the necessary path length difference to be achieved. If both the lengths and refractive indexes of the connecting fibers differ, the phase shift is due to contributions from both effects, which may increase or decrease the phase shift depending on whether the length difference in one fiber compensates for or contributes to the phase shift due to the refractive index difference between the two fibers, and vice versa. In this case, cleaving the fiber and changing the refractive index while monitoring the output can be used in conjunction to obtain the desired filter output.

Figure 7A:
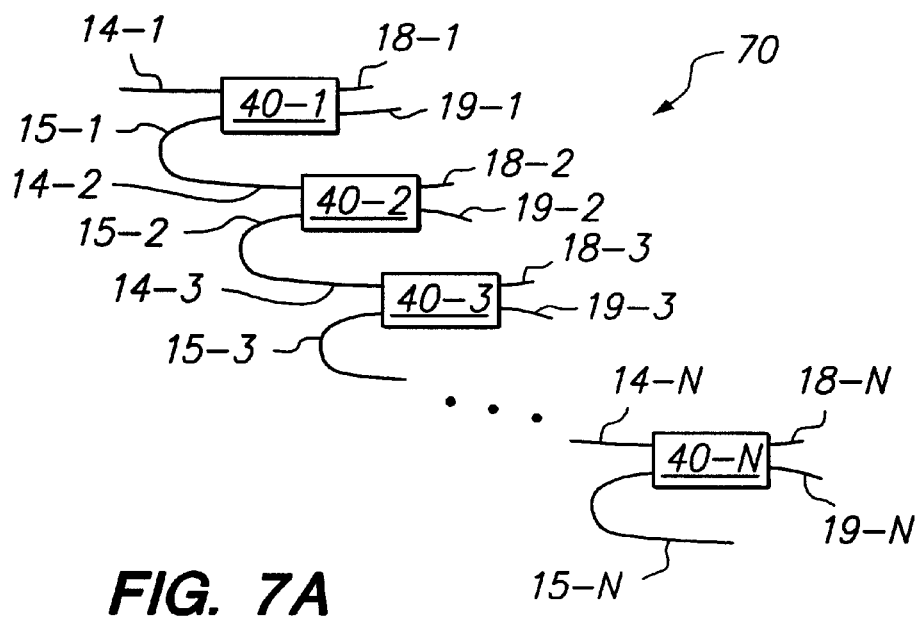
FIG. 7A shows a bandpass filter formed from cascading the MWFs of FIG. 4 according to one embodiment of the present invention.
Figure 7B:
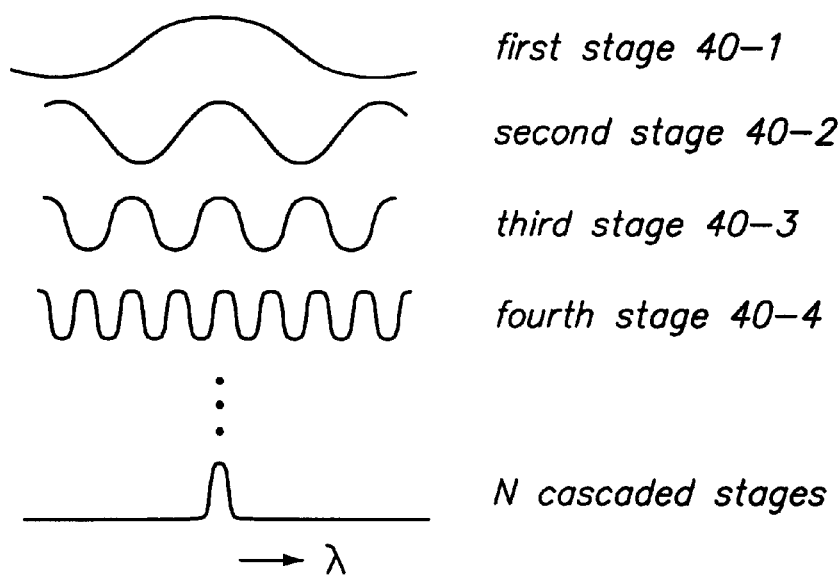
FIG. 7B shows the spectrum of various MWFs of the bandpass filter of FIG. 7A and the power transfer function of the bandpass filter of FIG. 7A.
Figure 7C:
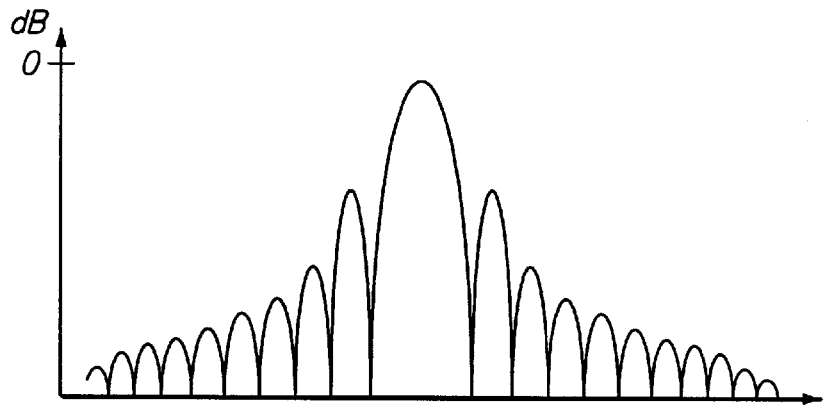
FIG. 7C shows a more detailed spectrum at the output of the bandpass filter of FIG. 7A.

In another aspect of the invention, a plurality of MWFs 40 of FIG. 4 can be cascaded to form a bandpass filter 70, as shown in FIG. 7A. A first MWF 40-1 with optical path length difference $\Delta L$ between fibers 18-1 and 19-1 has an output port 15-1 coupled to an input port 14-2 of a second MWF 40-2 with optical path length difference $2\Delta L$ between fibers 18-2 and 19-2. The output port 15-2 of second MWF 40-2 is coupled to an input port 14-3 of a third MWF 40-3 with optical path length difference 3ΔL between fibers 18-3 and 19-3. MWFs are cascaded in similar manner to a last MWF 40-N with optical path length difference $2^{N-1}\Delta L$ between fibers 18-N and 19-N. With bandpass filter 70, light entering input port 14-1 of first MWF 40-1 exits output port 15-N of last MWF 40-N with a wavelength λ. Thus, bandpass filter 70 only passes signals at the desired wavelength. FIG. 7B shows the output spectrum at the output ports 15 of the first four MWFs 40 with the same input for each MWF and the power transfer function of the last MWF 40-N when N MWFs 40 are cascaded. Consequently, by adjusting the interference phase, bandpass filter 70 can be used to filter a desired wavelength. FIG. 7C shows a more detailed spectrum of the output of bandpass filter 70 on a dB scale.

Figure 8:
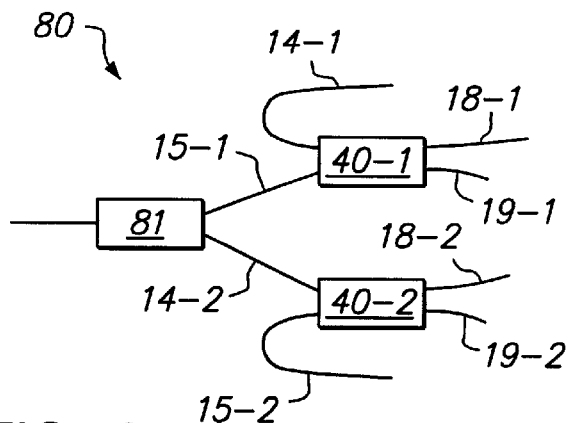
FIG. 8 shows a multi-window wavelength division multiplexer (MWDM) using the MWF of FIG. 4 according to one embodiment.
Figure 9:
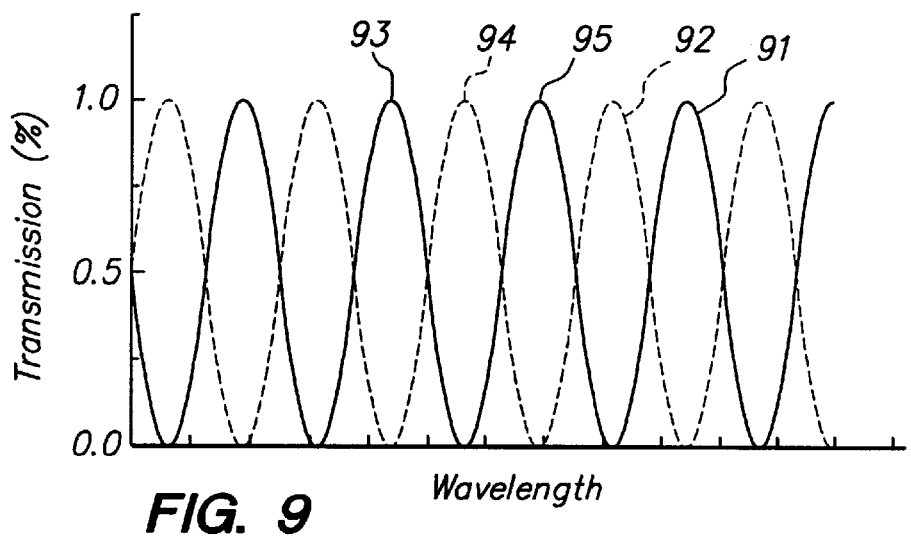
FIG. 9 shows a typical transmission spectrum at the output of the MWDM of FIG. 8.

MWF 40 of FIG. 4 can also be used as part of a multi-window wavelength division multiplexer (MWDM) 80, as shown in FIG. 8. MWDM 80 utilizes the optical path difference of two signals arriving at coupling region 11, which, due to the phase shift of the signals, causes different constructive and destructive interference at different wavelengths of the signals traveling out of the coupling region along fiber portions 14 and 15. MWDM 80 has a first MWF 40-1 and a second MWF 40-2, both having approximately the same optical path length difference. A fiber portion 15-1 of first MWF 40-1 is coupled to the output fiber of a 3-dB coupler 81, while a fiber portion 14-2 of second MWF 40-2 is coupled to the other output fiber of 3-dB coupler 81. Because fiber portions 18-1 and 19-1 of MWF 40-1 have the same optical path length difference as fiber portions 18-2 and 19-2 of MWF 40-2, the output spectrum from fiber portions 14-1 and 15-2 will exhibit complementary sinusoidal behavior, which consists of alternating peaks and nulls, as shown in FIG. 9. Solid line 91 represents the amplitude as a function of frequency of the output signal from one fiber output (e.g., fiber portion 14-1), while dashed line 92 represents the amplitude as a function of frequency for the simultaneous output signal from the other fiber output of the MWDM (e.g., fiber portion 15-2).

The channel spacing Δλ of a MWDM, defined as the wavelength separation between the transmission peak wavelengths of two adjacent channels, as shown, for example, by the separation of peaks 93 and 94, can be expressed by equation (4) as follows:

$$\Delta\lambda = \frac{\lambda^2}{n_1 l_1 - n_2 l_2} \quad (4)$$

where λ is the central wavelength, and $n_1$ and $n_2$ are the respective refractive indexes and $l_1$ and $l_2$ are the respective lengths of fiber portions 18 and 19. The window spacing of the MWDM, which is normally twice the channel spacing, is defined by the wavelength separation between two adjacent transmission peak wavelengths from a channel, as shown, for example, by the separation of peaks 93 and 95. The wavelength separation (or combination) capability of the MWDM depends on the number of windows and the window spacing of the MWDM. The number of windows or channels in a useable bandwidth can be adjusted by changing the path length difference between the two fiber portions 18 and 19, such as by any of the methods discussed above. As seen from equations (2) and (3), the output spectrum, as a function of λ, is sinusoidal, and by changing the path length difference, the channel separation can be increased or decreased.

Figure 10:
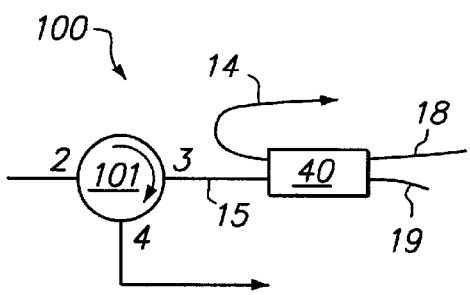
FIG. 10 shows an MWDM using the MWF of FIG. 4 and an optical circulator according to another embodiment.

FIG. 10 shows another embodiment of the present invention, in which an MWDM 100 is formed with one MWF 40 and one optical circulator 101. The optical circulator is an optical device that has at least three optical input/output (I/O) ports 102, 103, and 104, where light entering I/O port 102 is allowed to exit I/O port 103, light entering I/O port 103 is allowed to exit I/O port 104, and light entering I/O port 104 is allowed to exit I/O port 102. However, light is prohibited from passing through the circulator in the opposite direction, i.e., from I/O port 102 to I/O port 104, from I/O port 103 to I/O port 102, or from I/O port 104 to I/O port 103. MWDM 100 is formed by coupling I/O port 103 to one fiber portion 14 or 15 of MWF 40 (FIG. 10 shows coupling to fiber portion 15). The two outputs of the MWDM are the other fiber portion (e.g., fiber portion 14) of MWF 40 and I/O port 104 of circulator 101 and are complementary, as discussed above. Compared to the MWDM of FIG. 8, the use of a circulator decreases insertion loss associated with the 3-dB coupler, as well as eliminates the need for an additional MWF.

Figure 11:
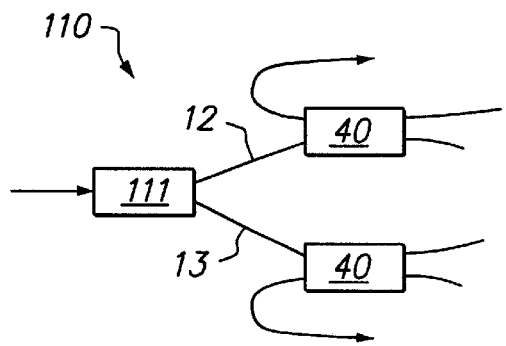
FIG. 11 shows a high isolation MWDM according to one embodiment.

To increase the isolation of the MWDM, i.e., suppression of sidelobes of adjacent and neighboring channels, thereby reducing the cross-talk between channels, the above-described MWDMs or other MWDMs can be coupled to MWFs 40, such as described in commonly-owned U.S. patent application Ser. No. 09/249,899, entitled "Expandable Wavelength Division Multiplexer Based on Interferometric Devices", filed Feb. 16, 1999, which is incorporated by reference herein in its entirety. FIG. 11 shows a high isolation MWDM 110 according to one embodiment. MWDM 110 includes an MWDM 111, which can be the MWDM of FIG. 8 or FIG. 10, or any other suitable MWDM, having each of the two output branches 112 and 113 coupled to a single MWF 40 with the same channel separation Δλ as that of MWDM 111. The resulting output signal from each of the two MWFs 40 has lower sidelobe powers than the signals from the MWDM 111 because the signal processed through the two MWFs 40 with approximately the same transmission function as MWDM 111, which, on a logarithmic scale, essentially doubles the amount of sidelobe suppression. Consequently, cross-talk is reduced between adjacent and neighboring channels of MWDM 110. This structure can be expanded by cascading additional stages of MWDMs and MWFs.

By utilizing the MWFs 40 of the present invention, instead of unbalanced Mach-Zehnder Interferometers (MZIs), which are described in commonly-owned U.S. patent application Ser. No. 09/034,895, entitled "Fused-Fiber Multi-Window Wavelength Division Multiplexer Using Unbalanced Mach-Zehnder Interferometer", filed Mar. 3, 1998, which is incorporated by reference in its entirety, or other similar interferometric devices, the size of the high isolation MWDM 110 can be greatly decreased. For example, as compared to using unbalanced MZIs, using MWFs 40 of the present invention can reduce the size of the high isolation MWDM by approximately ⅔. The smaller size is due in part to being able to utilize MWF 40 without bending the fiber for the output, as shown in FIG. 4. It should be noted that FIGS. 8, 10, and 11, which show the fibers bent so that the output of the MWDM is in the same direction as the input is for illustration purposes only. As can be seen, by bending the fibers, the size of the MWDM necessarily increases.

Figure 12:
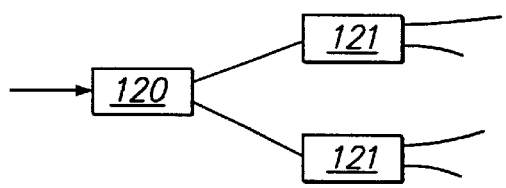
FIG. 12 shows a dense WDM according to one embodiment.

The MWDMs of FIGS. 8, 10, and 11 can be combined, either individually or in various combinations, to create a dense wavelength division multiplexer (DWDM) using techniques disclosed in commonly-owned U.S. Pat. No. 5,809,190, incorporated by reference above. For a given usable bandwidth, the number of channels propagating through a single fiber can be increased by cascading MWDMs, as shown in FIG. 12. Each of the two outputs of a first stage MWDM 120 are coupled to an input of two second stage MWDMs 121. If signals at four different wavelengths each enter one of the four fibers of MWDMs 121, the resulting signal exiting from MWDM 120 will have a channel separation of Δλ if the channel separation of signals from MWDMs 121 is 2Δλ. The resulting signal can be demultiplexed or separated by reversing the DWDM, i.e., by transmitting the signal from MWDM 120 out through MWDMs 121. Thus, by cascading MWDMs of the present invention in a plurality of stages, which decreases the channel isolation, and precisely adjusting the optical path lengths (described above) of the MWDMs, the desired interference state can be obtained for DWDM applications requiring narrow channel spacing. Although only two cascaded stages are shown, more channels can be coupled by cascading additional stages of MWDMs, which progressively decreases the channel spacing. Therefore, DWDMs, which may couple, for example, 8, 16, or even 32 discrete communication channels onto a single optic fiber, can be obtained.

However, because of the narrow channel spacing, DWDMs are much more sensitive to temperature variations, particularly on the refractive index of the fiber, which can shift the wavelength peaks within the useable bandwidth. For example, the refractive index may change at a rate of ~6×10⁻⁶/° C., and wavelength peaks may change at a rate of ~0.007 nm/° C. for light at wavelengths around 1550 nm. Thus, for a 100° C. change in temperature, the wavelength will shift be about 0.7 nm. Such a temperature-induced wavelength shift is significant for DWDM applications due to the small separation between channels. For example, with a 16-channel DWDM, the channel spacing might only be ~0.8 nm, and thus a potential temperature-induced 0.7 nm wavelength shift can pose significant problems.

Figure 13A:
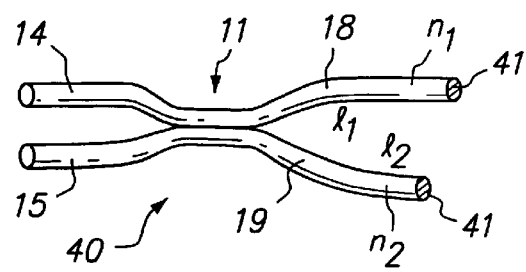
FIGS. 13A–13C show different types of passive thermal compensation for the MWF of FIG. 4.
Figure 13B:
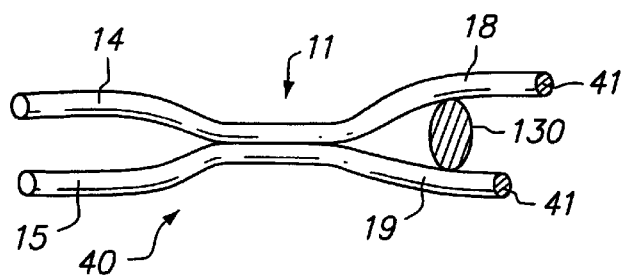
Figure 13C:
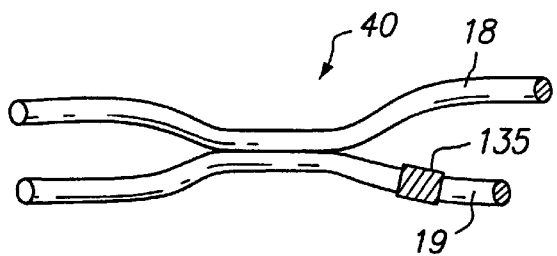

In order to minimize this effect, a passive thermal compensation (PTC) technique can be used so that changes in the refractive index in one fiber are offset by changes in the other fiber, resulting in little or no change to the optical path length difference. Various PTC techniques can be used, some of which are shown in FIGS. 13A–13C. In FIG. 13A, MWF 40 of FIG. 4 is shown with fiber portion 18 having length $l_1$ and refractive index n, and fiber portion 19 having length $l_2$ and refractive index $n_2$. One method of PTC is to adjust the lengths $l_1$ or $l_2$ and/or the refractive indexes $n_1$ or $n_2$ according to equation (5) as follows:

$$l_1 \frac{dn_1}{dT} = l_2 \frac{dn_2}{dT} \tag{5}$$

The term $$l_1 \frac{dn_1}{dT}$$

represents the phase change in fiber portion 18 and the term $$l_2 \frac{dn_2}{dT}$$

represents the phase change in fiber portion 19 due to temperature change. If these terms are equal, then the phase changes from the two fiber portions are offset.

FIG. 13B shows another method of PTC. In FIG. 13B, the two fiber portions 18 and 19 of MWF 40 are secured to a composite substrate 130 having two different thermal expansion coefficients. As temperature changes, substrate 130 expands or contracts at different rates where substrate 130 contacts the fiber portions. The different rates of expansion change the tension of the fiber portions in differing proportions. As a result, the refractive index change caused by temperature changes can be compensated for by changes in the tension of fiber portions 18 and 19. For example, substrate 130 can be comprised of a relatively low thermal expansion material (e.g., invar or quartz) contacting the longer optical path length fiber portion (e.g., fiber portion 18) and a relatively high thermal expansion material (e.g., Al, Cu, or glass) contacting the shorter optical path length fiber portion (e.g., fiber portion 19) so that the phase shift change of the two fiber portions are approximately equal.

FIG. 13C shows yet another PTC method suitable for the MWF of the present invention. A substrate 135 is secured to a section, under tension, of one fiber portion 18 or 19 of MWF 40 (fiber portion 19 is shown in FIG. 13C). As temperature changes, substrate 135 relieves (negative thermal expansion coefficient) or increases (positive thermal expansion coefficient) tension of the secured section of fiber portion 19. If secured to the fiber portion having the shorter path length, substrate 135 should be of a material having a positive thermal expansion coefficient (e.g., epoxy, glue, or Al), and if secured to the fiber portion having the longer path length, substrate 135 should be of a material having a negative thermal expansion coefficient (e.g., carbon fiber). Thus, by using PTC with the MWDM of the present invention, effects of temperature-induced wavelength shifts in DWDMs can be minimized to maintain desired optical path length differences and passband wavelengths.

The above-described embodiments of the present invention are merely meant to be illustrative and not limiting. It will thus be obvious to those skilled in the art that various changes and modifications may be made without departing from this invention in its broader aspects. For example, although specific techniques were discussed for obtaining differing optical path lengths, any suitable method can be used in accordance with this invention. Therefore, the appended claims encompass all such changes and modifications as fall within the true spirit and scope of this invention.

We claim:

1. A method of forming a fused-fiber multi-window wavelength filter (MWF), comprising:

fusing a first and a second optic filter in an interior portion of the first and second optic fibers to form a fused coupled region;

cleaving a first end of the first optic fiber to form a first portion having a length $l_1$;

cleaving a first end of the second optic fiber to form a second portion having a length $l_2$; and forming a reflective surface on the first ends of the first and second optic fiber, wherein the first and second portions have different optical path elements, wherein the forming comprises applying a reflective coating on the first ends of the first and second optic filter.

2. The method of claim 1, wherein $l_1$ and $l_2$ are different.

3. The method of claim 1, wherein the reflective indexes $n_1$ and $n_2$ of the first and second portions, respectively, are different.

4. A method of forming a fused-fiber multi-window wavelength filter (MWF), comprising:

fusing a first and a second optic filter in an interior portion of the first and second optic fibers to form a fused coupled region;

cleaving a first end of the first optic fiber to form a first portion having a length $l_1$;

cleaving a first end of the second optic fiber to form a second portion having a length $l_2$; and forming a reflective surface on the first ends of the first and second optic fiber, wherein the first and second portions have different optical path elements, wherein the forming comprises attaching a reflective substrate to the first ends of the first and second optic filter.

5. A method of forming a fused-fiber multi-window wavelength filter (MWF), comprising:

fusing a first and a second optic filter in an interior portion of the first and second optic fibers to form a fused coupled region;

cleaving a first end of the first optic fiber to form a first portion having a length $l_1$;

cleaving a first end of the second optic fiber to form a second portion having a length $l_2$;

forming a reflective surface on the first ends of the first and second optic fiber, wherein the first and second portions have different optical path elements; and inserting a composite substrate between the first and second portions, wherein the composite substrate applies different tension to the first and second portions as temperature changes.

6. A method of forming a fused-fiber multi-window wavelength filter (MWF), comprising:

fusing a first and a second optic filter in an interior portion of the first and second optic fibers to form a fused coupled region;

cleaving a first end of the first optic fiber to form a first portion having a length $l_1$;

cleaving a first end of the second optic fiber to form a second portion having a length $l_2$;

forming a reflective surface on the first ends of the first and second optic fiber, wherein the first and second portions have different optical path elements; and securing a substrate on the first portion, wherein the substrate expands or contracts with temperature to increase or decrease tension in the first portion.

7. A bandpass filter, comprising:

a first multi-window filter (MWF), comprising:
 a first fiber portion for inputting a light source;
 a second fiber portion for outputting a light signal;
 a third fiber portion having a length $l_1$, a refractive index $n_1$, and a first reflective end;
 a fourth fiber portion having a length $l_2$, a refractive index $n_2$, and a second reflective end, wherein the third and fourth fiber portions have different optical path lengths; and
 a fused region coupling the first, second, third, and fourth fiber portions; and a second MWF, comprising:
 a first fiber portion coupled to the second portion of the first MWF;
 a second fiber portion for outputting a second light signal;
 a third fiber portion having a length $l_3$, a refractive index $n_3$, and a first reflective end:
 a fourth fiber portion having a length $l_4$, a refractive index $n_4$, and a second reflective end, wherein the third and fourth fiber portions have different optical path lengths.

8. The bandpass filter of claim 7, wherein the first MWF and the second MWF have different optical path lengths.

9. The bandpass filter of claim 7, wherein the second MWF has an optical path length twice that of the first MWF.

10. The bandpass filter claim 7, further comprising N MWFs similar to the first MWF and similarly cascaded with a second fiber portion of an MWF coupled to a first fiber portion of the next MWF.

11. A multi-window wavelength division multiplexer (MWDM), comprising:

a first multi-window wavelength filter (MWF) having an input fiber, an output fiber, first and second reflecting fibers, and a fused region coupling the input, output, and first and second reflecting fibers, wherein the first and second reflecting fibers have an optical path length difference;

a second MWF having an input fiber, an output fiber, first and second reflecting fibers, and a fused region coupling the input, output, and first and second reflecting fibers, wherein the first and second reflecting fibers of the second MWF have the same path length difference as the first and second reflecting fibers of the first MWF, and wherein the output of the second MWF is complementary to the output of the first MWF; and a coupler having an input fiber, a first output fiber coupled to the input fiber of the first MWF and a second output fiber coupled to the input fiber of the second MWF.

12. The device of claim 11, wherein the ends of the first and second reflecting fibers of the first and second MWF are coated with a highly reflective material.

13. The device of claim 11, further comprising a highly reflective structure attached to the ends of the first and second reflecting fibers of the first and second MWF.

14. The device of claim 11, wherein the coupler is a 3-dB coupler.

15. A high isolation multi-window wavelength division multiplexer (MWDM), comprising:

a first multi-window wavelength filter (MWF) having an input fiber, an output fiber, first and second reflecting fibers, and a fused region coupling the input, output, and first and second reflecting fibers, wherein the first and second reflecting fibers have an optical path length difference;

a second MWF having an input fiber, an output fiber, first and second reflecting fibers, and a fused region coupling the input, output, and first and second reflecting fibers, wherein the first and second reflecting fibers of the second MWF have the same path length difference as the first and second reflecting fibers of the first MWF; and an MWDM having an input fiber and two output fibers and a channel separation capability of $\Delta\lambda$, each of the two output fibers coupled to the input fiber of the first and second MWFs, wherein the first and second MWFs have the same channel separation capability $\Delta\lambda$ as the MWDM.

16. A dense wavelength division multiplexer (DWDM), comprising:

a first multi-window WDM (MWDM), comprising:
 a first fiber portion for inputting a light source;
 a second fiber portion for outputting a light signal;
 a third fiber portion having a length $l_1$, a refractive index $n_1$, and a first reflective end;
 a fourth fiber portion having a length $l_2$, a refractive index $n_2$, and a second reflective end, wherein the third and fourth fiber portions have different optical path lengths; and
 a fused region coupling the first, second, third, and fourth fiber portions;

a second MWDM having an input fiber and two output fibers; and a third MWDM having an input fiber and two output fibers, wherein two of the three MWDMs are coupled to the third of the three MWDMs to form a cascaded stage of MWDMs.

* * * * *